No. 663,662. Patented Dec. 11, 1900.
N. A. NIELSEN.
TOASTING FORK.
(Application filed Mar. 31, 1899.)
(No Model.)
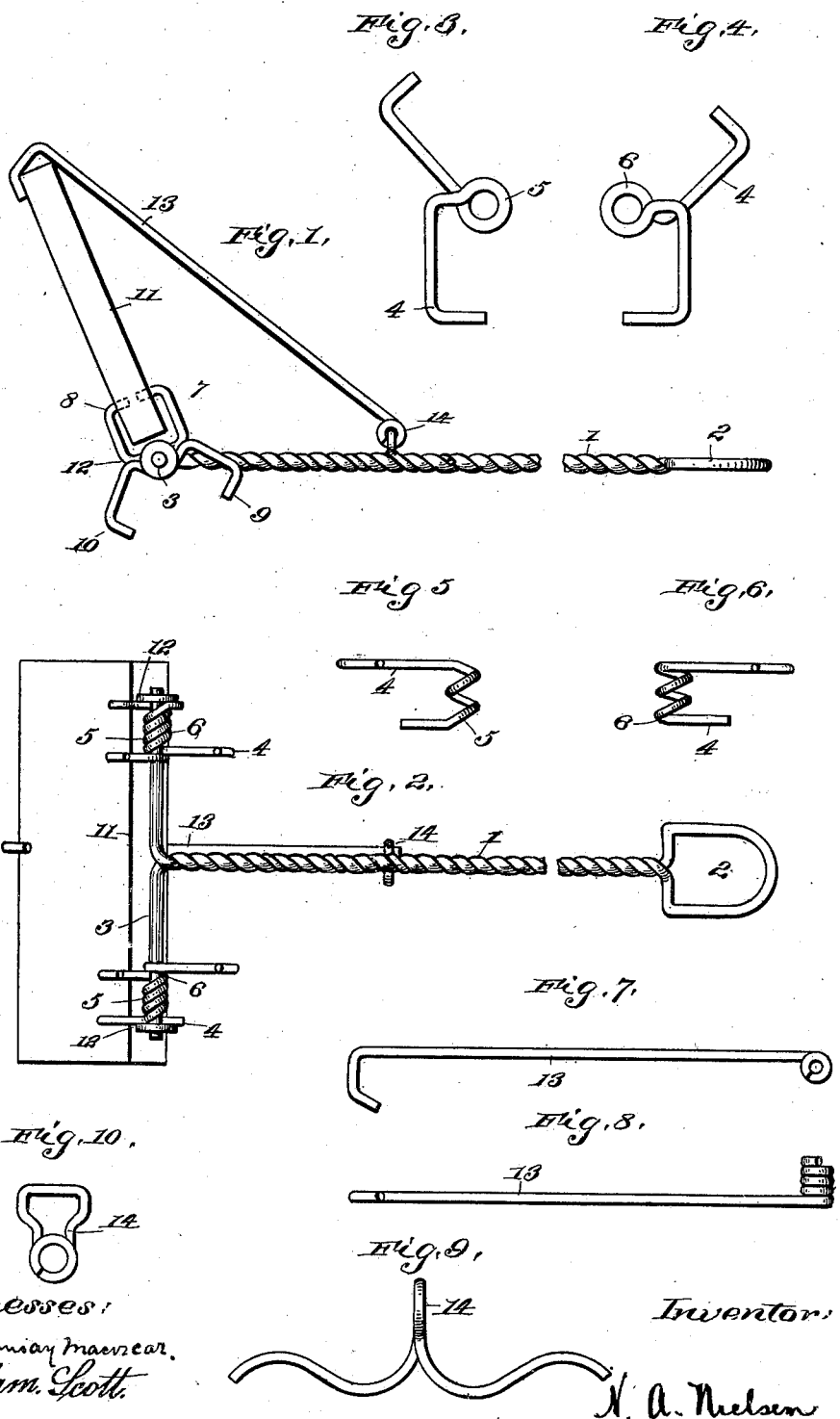

UNITED STATES PATENT OFFICE.

NIELS ANDREW NIELSEN, OF TIKOKINO, NEW ZEALAND.

TOASTING-FORK.

SPECIFICATION forming part of Letters Patent No. 663,662, dated December 11, 1900.

Application filed March 31, 1899. Serial No. 711,322. (No model.)

*To all whom it may concern:*

Be it known that I, NIELS ANDREW NIELSEN, a citizen of New Zealand, residing at Tikokino, in the county of Waipawa and Province of Hawkes Bay, New Zealand, have invented a new and useful Toasting-Fork, (for which I have filed an application for patent, No. 10,927, in New Zealand, bearing date August 31, 1898,) of which the following is a specification.

This invention relates to forks used for holding slices of bread near a fire to toast the same, and belongs to that class of forks by which the slice may be reversed without removing the same from the fork.

The object of the invention is to provide a reversible fork which will securely grip a slice of bread, which will hold it in any desired position, and from which it may be released with facility.

The construction of the fork is simple and inexpensive to manufacture.

My fork comprises a handle, which I prefer to make of twisted wire with a loop at the end for hanging up and holding the fork. The other end of the handle has a cross-bar provided with claws pivoted thereon. The slice of bread is gripped by these claws and is held in any desired position by a hook hinged to a nut screwed onto the handle. The claws are double, the empty ends being used to withdraw the other claws from the toasted slice of bread and to grip the next slice to be toasted.

In order that my invention may be most easily understood, reference will be made to the accompanying drawings, on which—

Figure 1 is a side view of the fork with a slice of bread gripped in the claws. Fig. 2 is a plan view of the same. Fig. 3 is a side view of one half-claw. Fig. 4 is a side view of the other half-claw. Fig. 5 is a top view of one half-claw. Fig. 6 is a top view of the other half-claw. Fig. 7 is a side view of the hook. Fig. 8 is a top view of the same. Fig. 9 is a side view of the nut. Fig. 10 is a front or rear view of the same.

Similar figures of reference indicate corresponding parts.

Describing the invention in detail by the aid of the drawings, the handle 1 has a loop 2 at one end and a cross-bar 3 at the other. The claws 4 are pivoted upon this cross-bar, the coil 5 of one half part engaging with the coil 6 of the other half part, as shown in Figs. 2, 5, and 6. The two halves of the claws are capable of limited independent rotary movement in respect of each other, and as shown on Fig. 1 the points 7 and 8 are closed to grip the slice of bread 11, and the points 9 and 10 are separated ready to grip the next slice. The claws upon each end of the bar 3 may be moved to bring them nearer together, and shoulders 12 prevent them from slipping off the bar. The hook 13 is formed of wire hinged onto a nut 14 on handle and forms a catch at the end to hold the slice in any desired position. When one side of the slice is toasted, the hook 13 is raised, when the slice will fall and present the other side to the fire. The nut 14 is now given half a turn, when the hook may again catch hold of the edge of the slice. To release the toast, the points 9 and 10 are brought together, if desired, upon a fresh slice of bread and the toasted slice of bread will then fall out.

Having now particularly described and ascertained the nature of my said invention and in what manner the same is to be performed, I declare that what I claim is—

A toasting-fork comprising a handle having a cross-bar at one end, claws made in halves and pivoted on the cross-bar and a hook hinged to a nut on the handle to hold the toast in position substantially as and for the purposes set forth herein.

Dated this 10th day of December, 1898.

NIELS ANDREW NIELSEN.

Witnesses:
  JOHN JANNEY BUCHANAN,
  JAMES MATHEWS.